(12) United States Patent
O'Hare et al.

(10) Patent No.: US 10,131,548 B2
(45) Date of Patent: Nov. 20, 2018

(54) MODIFICATION OF LAYERED DOUBLE HYDROXIDES

(71) Applicant: SCG Chemicals Co., Ltd., Bangkok Metropolis (TH)

(72) Inventors: Dermot O'Hare, Oxford (GB); Qiang Wang, Oxford (GB)

(73) Assignee: SCG CHEMICALS CO., LTD., Bangkok Metropolis (TH)

( * ) Notice: Subject to any disclaimer, the term of this patent is extended or adjusted under 35 U.S.C. 154(b) by 0 days.

(21) Appl. No.: 15/168,783

(22) Filed: May 31, 2016

(65) Prior Publication Data

US 2017/0001877 A1  Jan. 5, 2017

Related U.S. Application Data

(63) Continuation of application No. 14/367,437, filed as application No. PCT/IB2012/003073 on Dec. 18, 2012, now Pat. No. 9,382,123.

(30) Foreign Application Priority Data

Dec. 22, 2011 (GB) .................................. 1122163.7

(51) Int. Cl.

| C01F 7/76 | (2006.01) |
|---|---|
| C08K 3/26 | (2006.01) |
| C08K 3/28 | (2006.01) |
| C01F 7/00 | (2006.01) |
| C09C 1/40 | (2006.01) |
| C01B 35/12 | (2006.01) |
| C01F 11/00 | (2006.01) |
| C08K 3/22 | (2006.01) |
| C08K 3/30 | (2006.01) |

(52) U.S. Cl.
CPC ............ *C01F 7/767* (2013.01); *C01B 35/128* (2013.01); *C01F 7/002* (2013.01); *C01F 7/004* (2013.01); *C01F 7/005* (2013.01); *C01F 11/00* (2013.01); *C08K 3/22* (2013.01); *C08K 3/26* (2013.01); *C08K 3/28* (2013.01); *C08K 3/30* (2013.01); *C09C 1/40* (2013.01); *C01P 2002/01* (2013.01); *C01P 2002/22* (2013.01); *C01P 2002/50* (2013.01); *C01P 2002/84* (2013.01); *C01P 2002/88* (2013.01); *C01P 2004/04* (2013.01); *C01P 2004/54* (2013.01); *C01P 2004/61* (2013.01); *C08K 2003/2206* (2013.01); *C08K 2003/2224* (2013.01); *C08K 2003/2227* (2013.01); *C08K 2003/3045* (2013.01)

(58) Field of Classification Search
CPC ... C01F 7/767; C01F 7/00; C08K 3/26; C08K 3/28; C08K 3/30
USPC ....................................................... 524/429
See application file for complete search history.

(56) References Cited

U.S. PATENT DOCUMENTS

| 2008/0300352 A1* | 12/2008 | Schomaker | ........... C01B 13/363 524/381 |
| 2012/0253057 A1* | 10/2012 | Feng | ......................... C11C 3/10 554/167 |

FOREIGN PATENT DOCUMENTS

| CN | 101972631 | * | 2/2011 |
| EP | 1348692 A1 | | 10/2003 |
| EP | 2174909 A1 | | 4/2010 |
| EP | 2540770 A2 | | 1/2013 |
| WO | WO 99/24139 A1 | | 5/1999 |
| WO | WO2007/065860 A1 | | 6/2007 |
| WO | WO2007/065861 A1 | | 6/2007 |

OTHER PUBLICATIONS

International Search Report of PCT/IB2012/003073 filed Dec. 18, 2012.
Khan, Aamir I. et al. "Recent Developments in the Use of Layered Double Hydroxides as Host Materials for the Storage and Triggered Release of Functional Anions." Ind. Eng. Chem. Res. 2009, 48, pp. 10196-10205.

* cited by examiner

*Primary Examiner* — Deve E Valdez
(74) *Attorney, Agent, or Firm* — Dorsey & Whitney LLP

(57) ABSTRACT

The present invention relates to a process for modifying a layered double hydroxide (LDH), the process comprising, a. providing a material comprising a layered double hydroxide of formula: $[M^{2+}_{1-x}M'^{y+}_{x}(OH)_2]^{q+}(X^{n-})_{q/n}.bH_2O$ wherein M and M' are metal cations, z is 1 or 2, x is 0.1 to 1, b is 0 to 5, y is 3 or 4, X is an anion, n is 1 to 3 and q is determined by x, y and z, b. optionally washing the material at least once with a mixture of water and a mixing solvent miscible with water, and c. washing the material obtained in step a or b at least once with at least one first solvent, the first solvent being miscible with water and having a solvent polarity P'.

20 Claims, 13 Drawing Sheets

Mg$_3$Al$_1$-CO$_3$ LDHs DISPERSE IN XYLENE SOLUTION

DISPERSION OF Mg$_3$Al$_1$-CO$_3$ pH 12 IN XYLENE, 1.25g/L, 2.5g/L, 5g/L, AND 10g/L

PICTURES OF SYNTHESIZED PP/Mg$_3$Al$_1$-CO$_3$ LDH NANOCOMPOSITE
WITH DIFFERENT LOADINGS

XRD PATTERNS OF PURE PP AND PP/Mg$_3$A1$_1$-CO$_3$ LDH NANOCOMPOSITE (6 WT%), (▼) Mg$_3$A1$_1$-CO$_3$

TEM IMAGES OF Mg$_3$Al$_1$-CO$_3$ LDH DISPERSED IN H$_2$O

TEM IMAGE OF Mg$_3$Al$_1$-CO$_3$ LDH DISPERSED IN XYLENE

EFFECT OF THE INTERLAYER ANIONS ON THE CRYSTALLISATION TEMPERATURE OF PP/LDH NANOCOMPOSITES

EFFECT OF THE LDH LOADINGS ON THE CRYSTALLISATION TEMPERATURE OF HDPE/LDH NANOCOMPOSITES

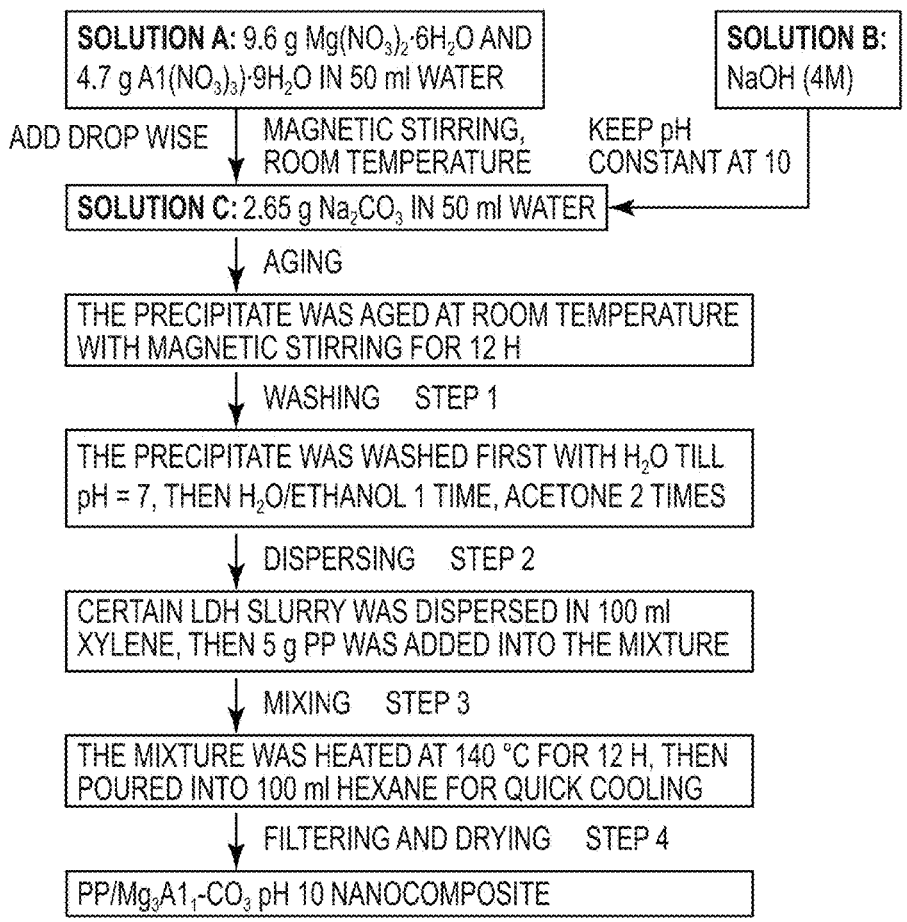

FLOW DIAGRAM OF THE SYNTHESIS OF PP/Mg$_3$Al$_1$-CO$_3$ pH 10 NANOCOMPOSITE

STEP 1: WASHING TILL pH = 7 WITH WATER, WASHING WITH H$_2$O/ETHANOL AND THEN ACETONE (OR ANOTHER SUITABLE SOLVENT).

STEP 2: DISPERSING THE LDH THE A HYDROCARBON SOLVENT AND THEN ADDING A POLYMER TO MAKE A HOMOGENEOUS SOLUTION.

STEP 3: RECOVERY OF A SOLID LDH/POLYMER NANOCOMPOSITE BY ADDITION OF A PRECIPITATING SOLVENT OR BY EVAPORATION OF THE SOLVENT.

Fig. 15

MODIFICATION OF LAYERED DOUBLE HYDROXIDES

The present invention relates to processes for modifying a layered double hydroxides (LDHs), in particular, by dispersing LDHs in solvents with an optional, subsequent step of dissolving polymer material in the LDH dispersion. The invention also relates to stable dispersions of LDHs in solvents and composites of polymer and LDH.

Layered double hydroxides (LDHs) are a class of compounds which comprise two metal cations and have a layered structure. A review of LDHs is provided in *Structure and Bonding*; Vol 119, 2005 *Layered Double Hydroxides* ed. X Duan and D. G. Evans. The hydrotalcites, perhaps the most well-known examples of LDHs, have been studied for many years. LDH's can intercalate anions between the layers of the structure. WO 99/24139 discloses use of LDHs to separate anions including aromatic and aliphatic anions.

LDH materials are generally hydrophilic and it has proven difficult to form LDH composites with generally hydrophobic materials. It would however be greatly advantageous to provide LDH/polymer composites.

It would also be advantageous to provide for stable dispersions of LDHs in relatively non-polar solvents. There have been attempts to modify LDHs to enable stable dispersions or good composites to be formed.

WO-A-2007/065860 relates to processes of preparing nanocomposites of rubber and LDH by chemically linking organic anions through silane groups to the rubber.

EP-A-2174909 relates to LDHs containing generally acidic organic compounds to reduce discolouration of LDH-containing polymers.

WO-A-2007/065861 relates to LDHs having fatty acid anions intercalated therein to promote compatibility with polymers.

Unfortunately, until now a prerequisite condition for using LDHs as a nanofiller in a polymer/LDH composite was making the LDH platelets compatible with the polymer which required appropriate and expensive treatment of either the polymer or the LDH prior to their incorporation into polymer matrix. Thus, previous attempts to stabilise LDH/relatively non-polar systems require complicated processing and often do not succeed. Furthermore, the organo-modified LDH materials often decompose at a relatively low temperature.

SUMMARY

It is an aim of the present invention to address these problems. The present invention accordingly provides in a first aspect, a process for modifying a layered double hydroxide (LDH), the process comprising, (a) providing a material comprising a layered double hydroxide of formula:

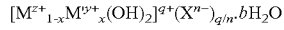

wherein M and M' are metal cations, z is 1 or 2, x is 0.1 to 1, b is 0 to 5, y is 3 or 4, X is an anion, n is 1 to 3 and q is determined by x, y and z, (b) optionally washing the material at least once with a mixture of water and a mixing solvent miscible with water, and (c) washing the material obtained in step a or b at least once with at least one first solvent, the first solvent being miscible with water and preferably having a solvent polarity (P') in the range of 3.8 to 9 to obtain a modified layered double hydroxide.

BRIEF DESCRIPTION OF THE DRAWINGS

FIG. 15 is a flow diagram of the synthesis of PP/$Mg_3Al_1$—$CO_3$ nanocomposite.

DETAILED DESCRIPTION

Figure 1:
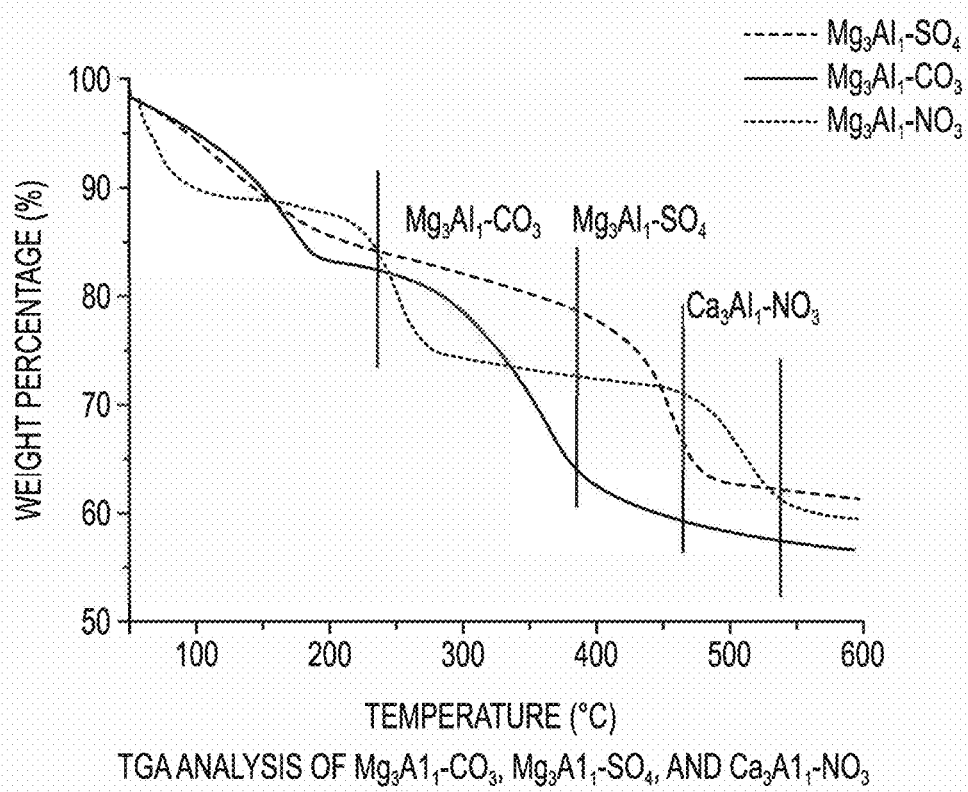
FIG. 1 is a graph of the thermogravimetric analysis (TGA) of $Mg_3Al_1$—$CO_3$, $Mg_3Al_1$—$SO_4$, and $Ca_3Al_1$—$NO_3$.

Described herein is a process comprising, (a) providing a material comprising a layered double hydroxide of formula:

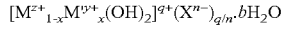

wherein M and M' are metal cations, z is 1 or 2, x is 0.1 to 1, b is 0 to 5, y is 3 or 4, X is an anion, n is 1 to 3 and q is determined by x, y and z, (b) optionally washing the material at least once with a mixture of water and a mixing solvent miscible with water, and (c) washing the material obtained in step a or b at least once with at least one first solvent, the first solvent being miscible with water and preferably having a solvent polarity (P') in the range of 3.8 to 9 to obtain a modified layered double hydroxide.

Solvent polarity (P') is defined based on experimental solubility data reported by Snyder and Kirkland (Snyder, L. R.; Kirkland, J. J. In *Introduction to modern liquid chromatography*, 2nd ed.; John Wiley and Sons: New York, 1979; pp 248-250) and as described in the table in the Examples section, below.

M may be a single metal cation or a mixture of different metal cations for example Mg, Zn, Fe for a MgFeZn/Al LDH. Preferred M is Mg, Zn, Fe, Ca or a mixture of two or more of these.

Preferably, z is 2 and M is Ca or Mg or Zn or Fe.

Preferably, M' is Al.

The preferred LDHs are Mg/Al, Ca/Al or Zn/Al.

Preferably, the particle size of the LDH particles comprised in the material is in the range of 1 nm to 50 microns, preferably 1 nm to 20 microns, more preferably 5 nm to 20 microns and most preferably 10 nm-20 microns.

Generally any dimension of the LDH particles may be in this range, but, preferably the LDH particles have a thickness (substantially perpendicular to the layers of the particles) in this range or ranges.

Although LDHs particles up to 20 microns can generally be used or dispersed in a nonpolar solvent after being modified using the method of the invention, generally the smaller the particle is, the more stable is the colloid solution and larger effect it has on the polymer composite on a wt % basis. Therefore, LDHs with a particle size of 20 microns or less are preferred.

Preferably, the aspect ratio of the LDH particles will be in the range 30 nm to 1500 nm (determined as platelet area/platelet thickness) preferably 80 to 500 nm and more preferably 100 nm to 350 nm.

The anion X in the LDH may be any appropriate anion, organic or inorganic, preferably selected from halide (e.g. chloride), inorganic oxyanions (eg. $Y_mO_n(OH)_p{}^{q-}$; m=1-5; n=2-10; p=0-4, q=1-5; Y=B, C, N, S, P), anionic surfactants (such as sodium dodecyl sulfate, Fatty acid salts or sodium stearate), anionic chromophores, an anionic UV absorbers (for example 4-hydroxy-3-10 methoxybenzoic acid, 2-hydroxy-4 methoxybenzophenone-5-sulfonicacid (HMBA), 4-hydroxy-3-methoxy-cinnamic acid, p aminobenzoicacid and/or urocanic acid), or mixtures thereof.

The step of washing with a mixture of water and the mixing solvent results in even further improved results including (if the material is subsequently dispersed) improved dispersion of the LDH in the hydrocarbon solvent. It is preferred if the mixing solvent in mixture with water comprises a relatively polar solvent, more preferably an alcohol and most preferably the mixing solvent is a $C_1$ to $C_3$ alcohol, e.g. methanol, ethanol or propanol. The preferred volume ratio of the mixing solvent and water is in the range 1:2 to 2:1.

It is preferred if the first solvent is neutral or alkaline. Although some relatively weak acid solvents may be used, if the pH is too low then this can adversely affect the properties of the LDH and a very low pH can result in dissolution of the LDH with reduction in the efficiency of the overall process. Preferably, therefore, the first solvent, when used in the process, has a pH of 7 or higher.

Generally, any suitable first solvent may be used but the preferred first solvent is selected from one or more of acetone, acetonitrile, dimethylformamide, dimethyl sulfoxide, dioxane, ethanol, methanol, n-propanol, iso-propanol, 2-propanol or tetrahydrofuran.

Preferably, the process further comprises a step d of dispersing the washed material obtained in step c in a second, hydrocarbon solvent to form a hydrocarbon-dispersed layered double hydroxide.

This process is greatly advantageous because despite being such a simple process it, surprisingly, results in good dispersion of the material comprising the LDH in the hydrocarbon solvent despite the fact that hydrocarbon solvents are non-polar. The resulting hydrocarbon-dispersed layered double hydroxide is advantageously used in various applications and may be used for further processing. By preparing a stable dispersion of the LDH in an appropriate solvent no pretreatment of the LDH (e.g. intercalation with a fatty acid) or functionalisation of the polymer chains is required.

Another great advantage of the invention is that the dispersion is generally stable and also optically transparent.

Preferably, the second, hydrocarbon solvent comprises an aromatic compound.

The second, hydrocarbon solvent is preferably selected from one or more of benzene, toluene, xylene, mesitylene, benzyl alcohol, chlorobenzene, o-dichlorobenzene, or trichlorobenzene.

The material (or dispersion if the material is dispersed in a hydrocarbon solvent) obtained in the first aspect of the invention may be used in subsequent processing steps, preferably, the inventive process is further comprising mixing the material with a polymer to form a LDH/polymer composite or in the inventive process is further comprising dissolving a polymer material in the hydrocarbon-dispersed layered double hydroxide to form a polymer loaded hydrocarbon dispersion.

Preferably, the polymer material is dissolved in the hydrocarbon-dispersed layered double hydroxide by heating to a predetermined temperature for a predetermined period. The predetermined temperature and period will depend upon the nature of the second, hydrocarbon solvent used to make the dispersion. However, generally the predetermined temperature will be in the range 25° C. to 250° C. The predetermined period will usually be that required for the dissolution of the polymer in the hydrocarbon-dispersion and will usually be less than 4 hours.

Processing of the polymer material dissolved in the hydrocarbon-dispersion is preferably further comprising precipitating a composite material (usually a nanocomposite i.e. an intimately mixed composite with interaction of the phases of the material on the nanometer scale) from the polymer loaded hydrocarbon dispersion. Such precipitation may be, for example, by rapidly cooling the polymer loaded hydrocarbon dispersion or by adding a fourth solvent to the polymer loaded hydrocarbon dispersion. Suitable fourth solvents include solvents such as water or an alkane, for example hexane.

Generally, the polymer that can be suitably used in this method is any polymer known in the art and, if it is to be dispersed, that is soluble in an aromatic solvent that disperses the LDHs.

Polymers as discussed in this specification are organic substances of at least two building blocks (i.e. monomers), including oligomers, copolymers, and polymeric resins. Suitable polymers for use in the invention are polyadducts and/or polycondensates. The polymers may be homopolymers and/or copolymers.

Preferably, the polymer material comprises at least one polymer selected from a polyolefin, vinyl polymers, saturated esters or mixtures thereof.

Even preferred, the polyolefin comprises polyethylene and/or polypropylene.

Examples of suitable polymers are polyolefins, such as polyethylene or polypropylene, vinyl polymers, such as polystyrene, polymethyl methacrylate, polyvinyl chloride, polyvinylidene chloride, saturated polyesters, such as polyethylene terephthalate.

Particularly preferred are polymers or copolymers obtainable by polymerization of at least one ethylenically unsaturated monomer. Examples of such polymers are polyolefins and vinyl polymers. The polyolefin or vinyl polymer can be a homopolymer or a copolymer. Suitable examples of such polymers are polyethylene, polypropylene, polybutylene, polystyrene, polyvinyl chloride, polyvinylidene chloride, and ethylene-propylene rubber, propylene-butene copolymer, ethylene-vinyl chloride copolymer, ethylene-vinyl acetate copolymer, acrylonitrile-butadiene-styrene copolymer (ABS), acrylonitrile-acrylate-styrene copolymer (AAS), methyl methacrylate-butadiene-styrene copolymer (MBS), chlorinated polyethylene, chlorinated polypropylene, ethylene-acrylate copolymer, vinyl chloride-propylene copolymer, and mixtures thereof. Even more preferred polymers are polyethylene, polypropylene, polystyrene, and polyvinyl chloride.

Specific examples of polyethylene are high-density polyethylene, low-density polyethylene, straight chain low-density polyethylene, ultra-low-density polyethylene, and ultra-high-molecular weight polyethylene. Examples of ethylene-based copolymers are ethylene-vinyl acetate copolymer (EVA), ethylene-ethyl acrylate copolymer (EEA), ethylene-methyl acrylate copolymer (EMA), and ethylene-acrylic acid copolymer (EAA). A specific example of a polypropylene is a so-called thermoplastic polyolefin (TPO), which include blends or reactor grades of polypropylene and EPR rubber.

One of the great advantages of the present invention is that the LDH dispersion can function as a multifunctional additive to the polymer. For example, ZnAl-LDHs have good UV absorption enhancing the UV stability of the polymer and LDH can acts as a radical scavenger to improve UV stability of PVC.

The anion used in the LDH can add additional properties to the dispersion. Thus, the anions may comprise for example one or more of the following: oxyanions (e.g. phosphate or carbonate) for improved thermal properties), anionic borates (for fire retardancy, smoke suppression), organic/inorganic anion chromophores (for colour), anionic UV absorbers (for UV stability).

Examples of specific anions that may be used include organic UV absorbers (such as 4-hydroxy-3-methoxybenzoic acid, 2-hydroxy-4 methoxybenzophenone-5-sulfonic acid (HMBA), 4-hydroxy-3-methoxy-cinnamic acid, p aminobenzoic acid and/or urocanic acid). Borate anions (such as $B(OH)_4^-$, $B_2O_4^{2-}$, $B_4O_5(OH)_4^{2-}$, $B_5O_6(OH)_4^-$) give good fire retardancy and smoke suppression to polymers such as PVC, anionic dyes (such as acid red 1(AR)—$C_{18}H_{33}N_3Na_2O_8S_2$, acid yellow 3(AY)—$C_{18}H_9NNa_2O_8S_2$, acid green 25(AG)—$C_{28}H_{20}N_2Na_2O_8S_2$, acid blue 45(AB)—$C_{14}H_8N_2Na_2O_{10}S_2$, AB 80(AB2)—$C_{32}H_{20}N_2Na_2O_8S_2$) give improved colour stability especially to bleaching by UV.

Homogeneously dispersed LDH(s) using this invention in a polymer matrix can dramatically improve any or all the following aspects of the polymer: mechanical properties, rheological properties, thermal properties, gas barrier properties, UV stability, IR absorbance, heat retention, colour stability, reduced flammability and smoke index. Combination of two or more LDH materials enables these properties to be further improved or tuned by adding mixtures of suitable LDHs.

Preferably, the LDH is present in a range of 0.01 to 85 wt %, preferably 0.1 to 50 wt %, even more preferably 0.5-50 wt % or 0.5 to 25 wt % and most preferably 0.5 to 15 wt %, based on the weight of polymer.

In a preferred embodiment of the invention, there is provided a composite material (preferably a nano-composite material), wherein the polymeric matrix is selected from polyolefins, vinyl polymers, polyesters, polycarbonates, polyamides, polyurethanes and/or polyepoxides.

The (nano)composite materials according to the invention are particularly suitable to be used for a large variety of applications. The materials are eminently processable and can be shaped in conventional shaping steps, such as injection molding and extrusion processes. Shaped articles of a variety of natures can be manufactured from the present nanocomposite material. Examples comprise any application for which the material of the polymeric matrix is suited. Preferred applications may include fibers, packaging materials and construction materials.

In a second aspect, the present invention provides a modified layered double hydroxide obtainable by the inventive process.

In a third aspect, the present invention provides a stable dispersion of the inventive modified layered double hydroxide of formula: $[M^{z+}_{1-x}M'^{y+}_x(OH)_2]^{q+}(X^{n-})_{q/n}.bH_2O$ in a hydrocarbon solvent, wherein M and M' are metal cations, z is 1 or 2, x is 0.1 to 1, b is 0 to 5, y is 3 or 4, X is an anion, n is 1 to 3 and q is determined by x, y and z.

In a fourth aspect the present invention provides a composite comprising a layered double hydroxide of formula: $[M^{z+}_{1-x}M'^{y+}_x(OH)_2]^{q+}(X^{n-})_{q/n}.bH_2O$ and a polymer material, wherein M and M' are metal cations, z is 1 or 2, x is 0.1 to 1, b is 0 to 5, y is 3 or 4, X is an anion, n is 1 to 3 and q is determined by x, y and z.

In a fifth aspect, the invention provides a process according to the first aspect but with the additional step of providing a material comprising two or more different layered double hydroxides of the formula specified above.

The great benefit of the fifth aspect of the invention is that adding two or more different LDHs into the polymer may markedly improve a number of properties such as its thermal stability and melting point, mechanical properties and/or UV stability. For example, addition of $Mg_3Al_1$—$CO_3$, $Mg_3Al_1$—$SO_4$, and $Ca_3Al_1$—$NO_3$ into a polymer, results in LDHs absorbing heat by different decompositions over the whole temperature range of 240-540° C. as illustrated by the thermogravimetric analysis (in relation to a mixture of LDHs without polymer) in FIG. 1.

The preferred and optional features of the second, third, fourth and fifth aspects of the invention are as discussed in relation to the first aspect and as specified in the claims.

The invention is further illustrated by the following Examples.

Examples

LDHs Dispersions in Hydrocarbons

LDHs were dispersed by modifying the LDH by washing with specific solvents. Inorgano-LDHs were successfully dispersed into hydrocarbon solvents such as xylene, enabling, for example, synthesis of polyolefin/inorgano-LDHs directly and simply.

Characterisation Methods

Elemental analysis was carried out using a quantitative combustion technique. Powder X-ray diffraction (XRD) data were collected on a PAN Analytical X'Pert Pro diffractometer in reflection mode at 40 kV and 40 mA using Cu Kα radiation ($α_1$=1.54057 Å, $α_2$=1.54433 Å, weighted average=1.54178 Å). Samples were mounted on stainless steel sample holders. A TA Instruments Q200 differential scanning calorimeter (DSC) was used to obtain DSC thermograms. Experiments were run on samples of about 10 mg. Each sample was first heated from room temperature to 220° C. with a heating rate of 10° C./min to remove thermal history, followed by cooling down to 40° C. at a rate of 10° C./min to record re-crystallization temperature, and then reheated to 220° C. at a rate of 10° C./min to determine the melt temperature. The experiments were carried out under an argon purge (50 mL/min). TEM images were obtained from a JEOL JEM-2100 transmission electron microscope.

The LDHs particles were dispersed in $H_2O$ or xylene and then loaded on to a Cu grid covered with a very thin carbon film.

Synthesis of LDH

LDH may be synthesized by a number of methods, e.g. coprecipitation method.

One example of the synthesis of $Mg_3Al_1$—$CO_3$ by coprecipitation method is as follows:

In brief, a salt solution A (100 ml) containing a mixture of 0.075 mol $Mg(NO_3)_2.6H_2O$ and 0.025 mol $Al(NO_3)_3.9H_2O$ was added drop-wise to a basic solution B (100 ml) containing 0.05 mol $Na_2CO_3$. The pH value of solution B was kept constant (10-14) by addition of a solution C (50 ml) containing 0.17 mol NaOH. The resulting mixture D was aged at room temperature for 24 h with continuous stirring. The aged mixture was filtered and washed with deionized water until pH=7.

Similarly, $Mg_3Al_1$—X with different inorganic anions including $NO_3^-$, $SO_4^{2-}$, $Cl^-$, etc can be synthesized. Briefly, $Mg_3Al_1$—$NO_3$ and $Mg_3Al_1$—$SO_4$ were prepared by adding an aqueous solution (100 ml) containing 0.075 mol $Mg(NO_3)_2.6H_2O$ and 0.025 mol $Al(NO_3)_3.9H_2O$ drop-wise to a solution (100) containing 0.05 mol $NaNO_3$ or $Na_2SO_4$. The pH was controlled at 10 during the whole preparation process using NaOH (3.4 M). $Mg_3Al_1$—Cl was synthesized by adding an aqueous solution (100 ml) containing 0.075 mol $MgCl_2$ and 0.025 mol $AlCl_3.xH_2O$ drop-wise into a solution (100 ml) containing 0.05 mol NaCl, with the pH controlled at ~10 using a NaOH solution (4 M).

Other syntheses of LDH materials are as follows:

Coprecipitation and intercalation reactions were carried out in round-bottomed flasks or finger ampoules appropriate to the scale of the reaction, containing a suitable solvent and a magnetic follower with a pivot ring. The contents of the flask were stirred for the requisite time at a suitable temperature. The mixture was allowed to cool and filtered using a sintered glass frit. If the filtrate was required, it was collected in a Büchner flask and removed before washing the solid residue with deionised water and acetone.

The powder was left to dry in air before characterisation by XRD.

Synthesis of $[Mg_2Al(OH)_6]NO_3.nH_2O$ and $[Ca_2Al(OH)_6]Cl.nH_2O$ $[Mg_2Al(OH)_6]NO_3.nH_2O$ was synthesised by coprecipitation. A mixed metal nitrate solution was prepared by dissolving 21.4 g of $Mg(NO_3)_2.6H_2O$ and 10.5 g of $Al(NO_3)_3.9H_2O$ in 100 ml of water. This was added dropwise to a solution of 6 g of NaOH and 9.5 g of $NaNO_3$ in 100 ml of water over a period of about 30 minutes. The mixture, which was thoroughly purged with nitrogen gas at all stages, was stirred vigorously for 24 hours at 80° C. The product formed as a white powder which was collected.

$[Ca_2Al(OH)_6]Cl.nH_2O$ was produced by the same method, in which $CaCl_2$ and $AlCl_3$ were added dropwise to a solution of NaOH and NaCl.

Synthesis of $[Ca_2Al(OH)_6]NO_3.nH_2O$ $[Ca_2Al(OH)_6]NO_3.nH_2O$ was synthesised by a salt-oxide method. 2.48 g of CaO was added to 100 ml of water and stirred until fully suspended. Then, to this suspension, 4.72 g of $Al(NO_3)$ was added and stirred until dissolved. The mixture, which was thoroughly purged with nitrogen at all stages, was stirred vigorously for 12 hours at 90° C. The solid product was collected. The product formed as a white powder.

Suitable modification of these methods enables particular LDH materials to be prepared.

Figure 2:
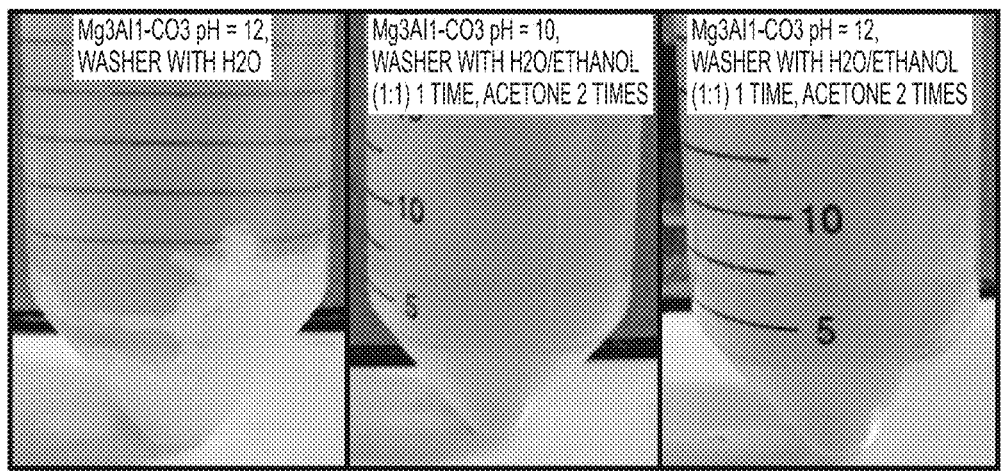
FIG. 2 is a series of photographs of $Mg_3Al_1$—$CO_3$ LDHs with water wash, LDH synthesised at pH12 (left), $H_2O$/ethanol and acetone wash (×2) LDHs synthesised at pH10 (middle) and pH12 (right) dispersed in xylene solution.
Figure 3:
FIG. 3 is a series of photographs of a dispersion of $Mg_3Al_1$—$CO_3$ pH 12 in xylene, at 1.25 g/L, 2.5 g/L, 5 g/L, and 10 g/L loading.

Modification of LDHs $Mg_3Al_1CO_3$ was synthesised at pH 12 and washed with water. No clear dispersion in xylene was observed as shown in FIG. 2, left. In contrast, when $Mg_3Al_1CO_3$ was washed with ethanol+$H_2O$ (1:1) once and then with acetone twice, LDHs synthesized at pH=10 and pH=12 were highly dispersed in xylene solution (FIG. 2, middle and right respectively). Then different amount of LDHs (1.25 g/L to 10 g/L) were dispersed in xylene to give a stable, optically transparent dispersion. All LDHs were highly dispersed, as shown in FIG. 3.

Synthesis of $Zn_2Al$-Borate LDH $Zn_2Al$-borate LDH was prepared by adding 100 ml $Zn(NO_3)_2.6H_2O$ (0.075 mol) and $Al(NO_3)_3.9H_2O$ (0.0375 mol) solution drop-wise into a 100 ml $H_3BO_3$ (0.187 mol) solution. The pH of the precipitation solution was controlled at ca. 8.3 using a NaOH (1 M) solution. During the whole synthesis, the system was protected with $N_2$ gas to prevent the contamination by atmosphere $CO_2$. The sample was washed with deionised (DI) water till pH close to 7. The water washed wet cake was further thoroughly washed with acetone (at least 3 times). And the acetone washed wet cake was directly used for the preparation of polymer nanocomposites (as described previously) without being dried.

Synthesis of $Mg_3Al$-Tartrazine LDH

First, $Mg_3Al$—$NO_3$ was synthesized by coprecipitation method. Metal precursor solution containing 9.6 g $Mg(NO_3)_2.6H_2O$ and 4.7 g $Al(NO_3)_3.9H_2O$ in 50 ml $H_2O$ was added drop-wise into the anion solution containing 2.125 g $NaNO_3$ in 50 ml $H_2O$, in the meantime, the pH was kept constant using NaOH (4 M). The mixture was aged at room temperature for 12 h, followed by filtration and washing with water until pH close to 7. The obtained water washed "wet cake" was directly used for the synthesis of $Mg_3Al$-tartrazine via anion exchange method. Then $Mg_3Al$-tartrazine LDH was synthesized by anion exchange method. The above obtained $Mg_3Al$—$NO_3$ LDH "wet cake" was re-dispersed in 130 ml aqueous solution containing 20.04 g tartrazine. The pH of the solution was adjusted to 10 using NaOH (4M), followed by aging at 70° C. for 12 h. The sample was washed with DI water till pH close to 7. The water washed wet cake was further thoroughly washed with acetone (at least 3 times). And the acetone washed wet cake was directly used for the preparation of polymer nanocomposites without being dried.

Synthesis of Polypropylene (PP)/LDHs Nanocomposite

The nanocomposite is synthesized as follows:
a) Disperse a pre-determined amount of LDHs (0-12 wt % corresponding to PP) into 100 ml xylene solution, then add 5 g PP.
b) Heat the mixture to ~140° C. and keep at this temperature for 2 h to dissolve PP completely.
c) Pour the mixture into 100 ml hexane (or water) and then filter and dry at 80° C. in a vacuum oven. The product is the nanocomposite.

A specific preparation of a (nano)composite is illustrated in FIG. 15

Figure 4:
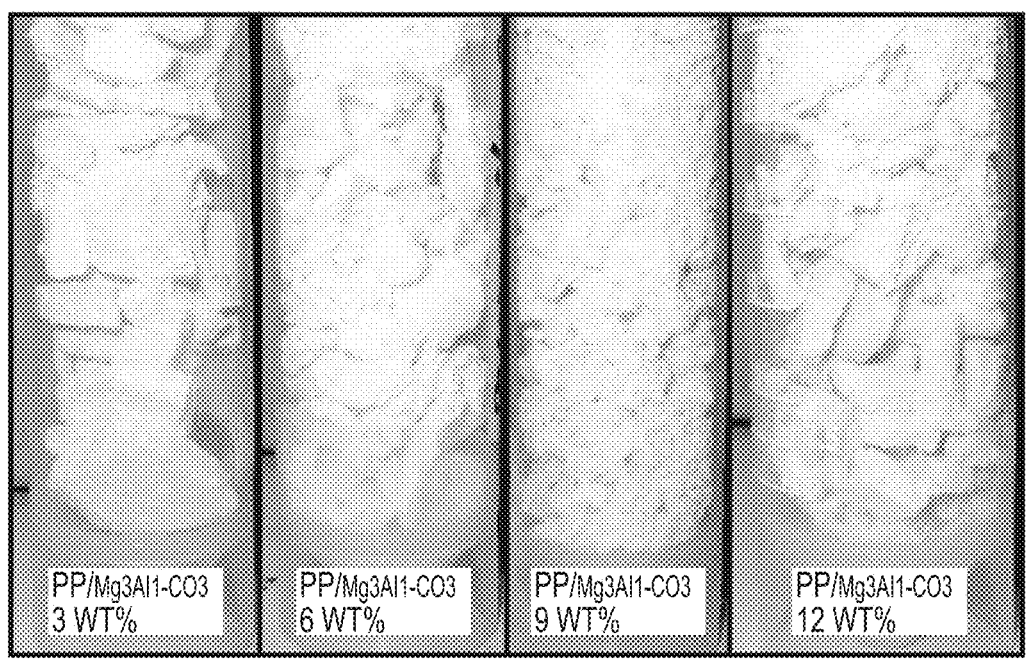
FIG. 4 is a series of photographs of synthesized PP/$Mg_3Al_1$—$CO_3$ LDH nanocomposite with different loadings.
Figure 5:
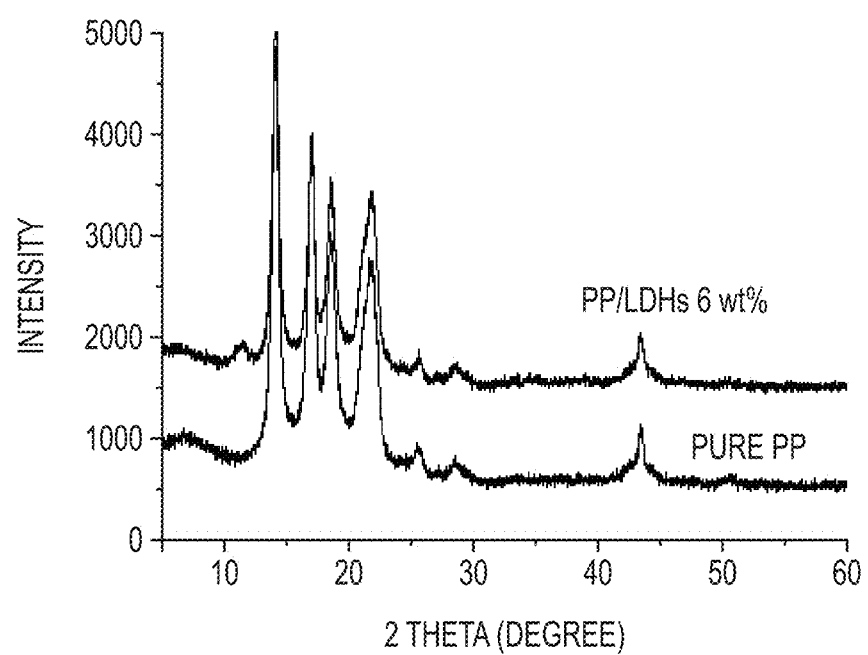
FIG. 5 shows X-ray diffractograms (XRD) of PP (polypropylene) and PP/$Mg_3Al_1$—$CO_3$ LDH nanocomposite (6 wt %), (▼) $Mg_3Al_1$—$CO_3$.

FIG. 4 shows the synthesized PP/$Mg_3Al_1$—$CO_3$ nanocomposites at different loadings. FIG. 5 shows the XRD patterns of pure PP and PP/$Mg_3Al_1$—$CO_3$ 6 wt %. The characteristic peak of $Mg_3Al_1$—$CO_3$ was noticed at 11.43° at for the nanocomposite sample, indicating the successful introduction of LDHs into PP.

This HDPE/$Mg_3Al_1$—$CO_3$ 9 wt % nanocomposite was synthesized with the same method as PP/LDHs. The detailed synthesis is as follows:

(1) Synthesize $Mg_3Al_1$—$CO_3$ LDH at pH 10 and room temperature.
(2) Wash the LDH with water to pH=7 first, then wash again with ethanol/$H_2O$ once, acetone twice.
(3) Disperse the LDH gel into xylene (100 ml) at room temperature.
(4) Put 5 g HDPE to the xylene solution, and heat the mixture to 140° C., hold at that temperature for 2 h to completely dissolve HDPE and mix with LDH.
(5) Pour the mixture into 150 ml Hexane to quickly cool and precipitate it
(6) Filter and dry in a vacuum oven at 80° C.

Figure 11:
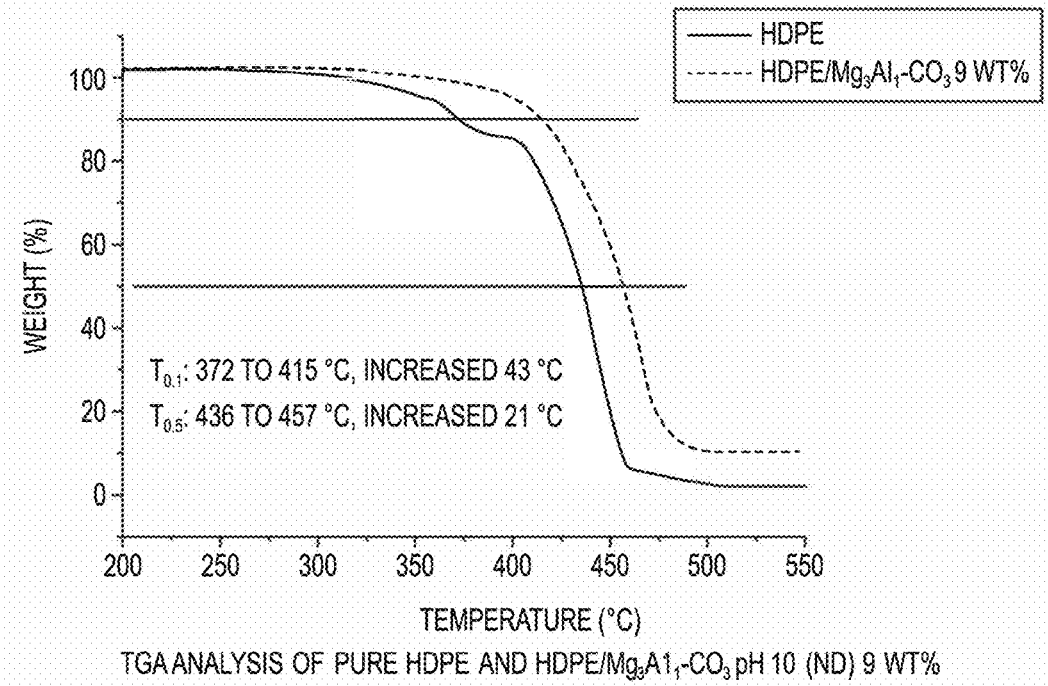
FIG. 11 shows TGA analysis of pure HDPE (high density polyethylene) and HDPE/$Mg_3Al_1$—$CO_3$ (9 wt %).

FIG. 11 shows that although HDPE is much more thermal stable than PP, adding LDHs can still increase its thermal stability.

Synthesis of Polypropylene (PP)/LDHs Nanocomposite

The nanocomposite is synthesized as follows:

a) Disperse a pre-determined amount of LDHs (0-12 wt % corresponding to PP) into 100 ml xylene solution, then add 5 g PP.

b) Heat the mixture to ~140° C. and keep at this temperature for 2 h to dissolve PP completely.

c) Pour the mixture into 100 ml hexane (or water) and then filter and dry at 80° C. in a vacuum oven. The product is the nanocomposite.

A specific preparation of a (nano)composite is illustrated in FIG. 15.

Flame Retardant Performance

The flame retardant performance of PP/$Zn_2Al$-borate nanocomposites was investigated using cone calorimetry. FIG. 1 shows the peak heat release rate (PHRR), which is the key metric for assessing polymer nanocomposite performance under real fire conditions. Adding $Zn_2Al$-borate LDHs significantly decreased the PHRR compared with pure PP. With 15 wt % of LDH, the PHRR was decreased from 1588 kW/$m^2$ for pure PP to 643 kW/$m^2$, and it can be further decreased to 517 kW/$m^2$ with 30 wt % LDH.

After cone calorimetry test, the formation of a residual char was observed for all samples except pure PP (see FIG. 2). According to the barrier fire retardant mechanism, the char can act as a barrier to both heat and mass transfer which makes it more difficult for degrading material to escape to the vapor phase and also prevents heat transfer back to the polymer. It is apparent that as increasing the LDH loading, the amount of char residue was increased.

Thermal Stability of PP/$Mg_3Al_1$—$CO_3$ pH 10 Nanocomposite.

Figure 6:
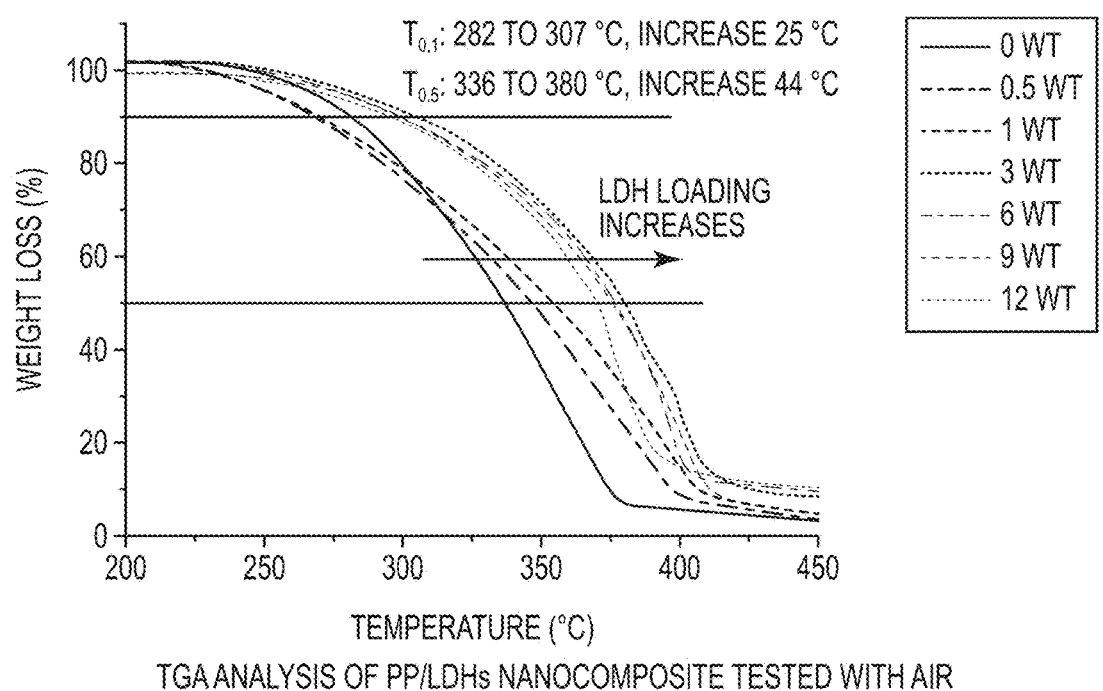
FIG. 6 shows TGA analysis of PP/LDHs nanocomposite tested in air.
Figure 7:
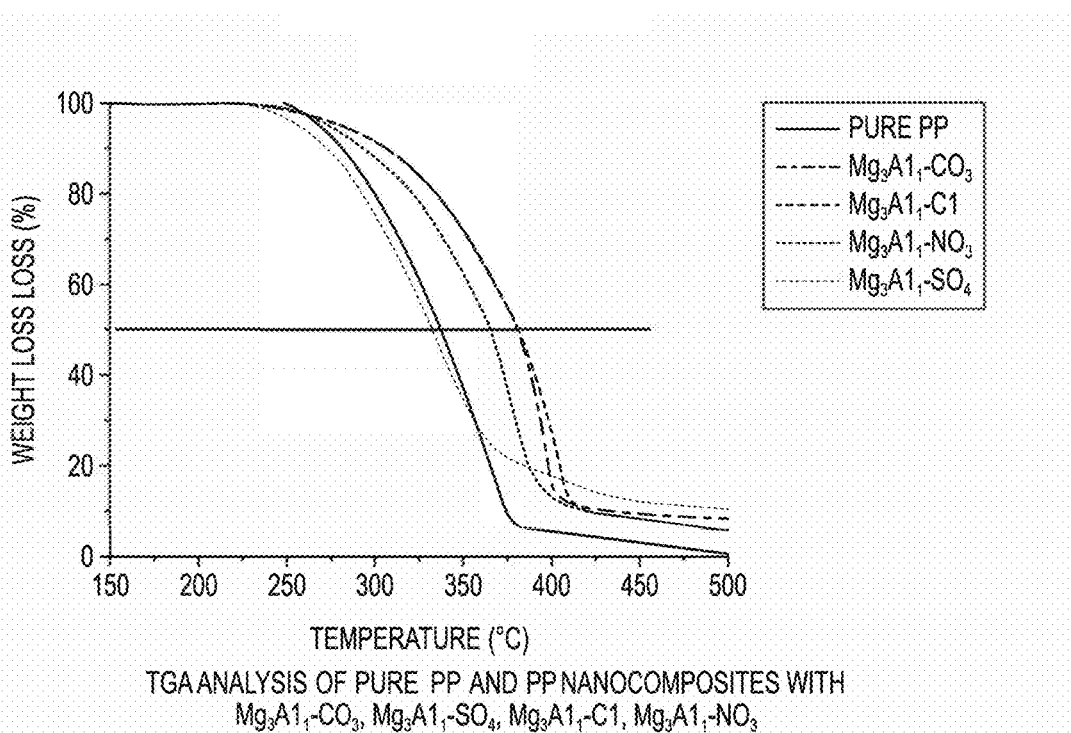
FIG. 7 shows TGA analysis of pure PP and PP nanocomposites with $Mg_3Al_1$—$CO_3$, $Mg_3Al_1$—$SO_4$, $Mg_3Al_1$—Cl, $Mg_3Al_1$—$NO_3$.
Figure 8:
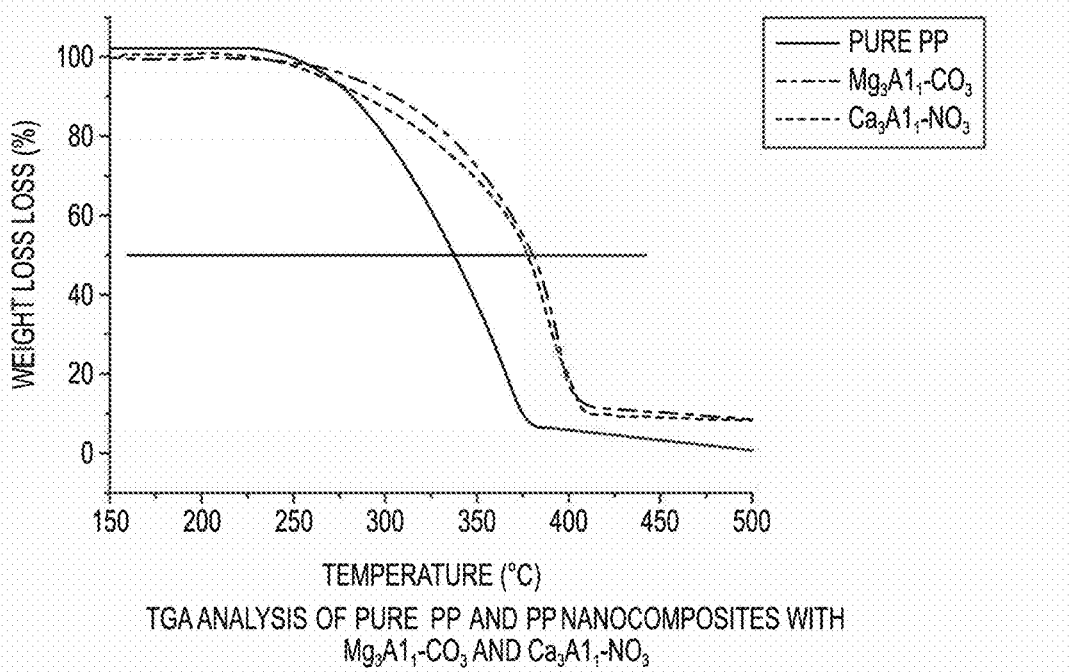
FIG. 8 shows TGA analysis of pure PP and PP nanocomposites with $Mg_3Al_1$—$CO_3$ and $Ca_3Al_1$—$NO_3$.

The thermal stability of PP/$Mg_3Al_1$—$CO_3$ was tested by TGA, as shown in FIG. 6. The optimal LDH loading is found to be ca. 9 wt %. The result indicates that the thermal stability of PP is highly enhanced. With 9 wt % LDH, the $T_{0.1}$ and $T_{0.5}$ was increased 25° C. and 44° C. respectively. We believe that some other properties could also be improved, e.g. the mechanical, rheological, and flame retardant properties.

Differential scanning calorimetry (DSC) was used to analyse the melting and crystallization behavior of the neat polypropylene (PP) and PP/LDHs nanocomposites. Experiments were run on samples of about 10 mg. Each sample was first heated from room temperature to 220° C. with a heating rate of 10° C./min to remove thermal history, followed by cooling down to 40° C. at a rate of 10° C./min to record the re-crystallization temperature, and then reheated to 220° C. at a rate of 10° C./min to determine the melt temperature. The experiments were carried out under an argon purge (50 mL/min).

a) Effect of LDH Loading for PP/LDH Nanocomposites.

Figure 12:
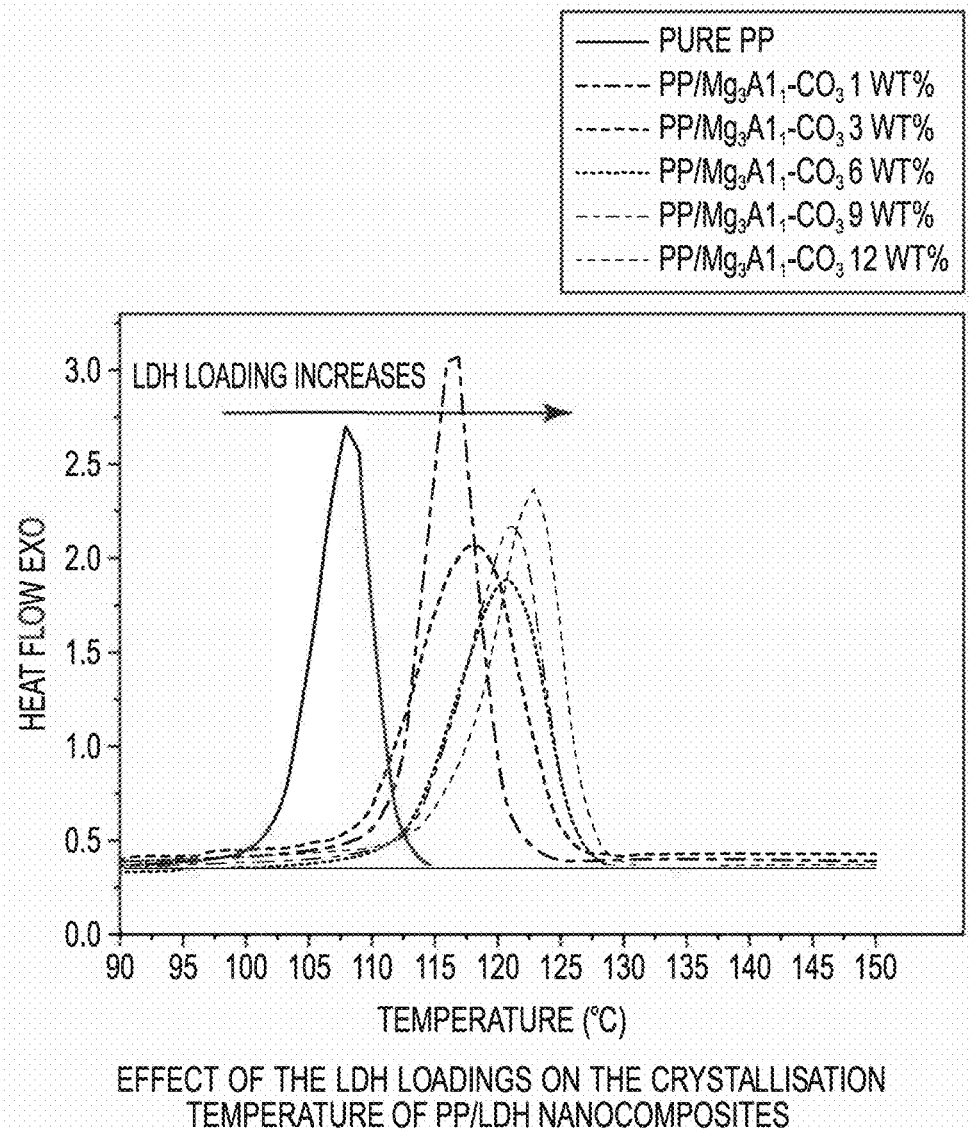
FIG. 12 shows the effect of the LDH loadings on the crystallisation temperature of PP/LDH nanocomposites.

From the DSC analysis, we noticed that both the crystallization temperature ($T_c$) and the melting temperature ($T_m$) were increased with $Mg_3Al_1$—$CO_3$ LDH as additive (See Table 1 and FIG. 12). It is obvious that the peak temperature increases with increasing LDH content. Particularly the $T_c$ was increased by 14.6° C. with 12 wt % LDH loading. This phenomenon may be due (without wishing to be bound) by the heterogeneous nucleation effect of $Mg_3Al_1$—$CO_3$ LDH nanoparticles on PP macromolecular segments which can be easily attached to the surface of the $Mg_3Al_1$—$CO_3$ LDH, which leads to the crystallization of PP to occur at a higher crystallization temperature.

TABLE 1

DSC results of PP/$Mg_3Al_1$—$CO_3$ with different LDH loadings.

| Nanocomposites | $T_c$/° C. | $\Delta H_c$/J $g^{-1}$ | $T_m$/° C. | $\Delta H_m$/J $g^{-1}$ |
| --- | --- | --- | --- | --- |
| Pure PP | 108.31 | 85.61 | 153.65 | 85.70 |
| PP/$Mg_3Al_1$—$CO_3$ 1 wt % | 116.52 | 91.85 | 156.19 | 90.28 |
| PP/$Mg_3Al_1$—$CO_3$ 3 wt % | 118.10 | 94.84 | 157.89 | 93.75 |
| PP/$Mg_3Al_1$—$CO_3$ 6 wt % | 120.81 | 81.76 | 158.34 | 86.67 |
| PP/$Mg_3Al_1$—$CO_3$ 9 wt % | 121.27 | 87.94 | 157.98 | 89.37 |
| PP/$Mg_3Al_1$—$CO_3$ 12 wt % | 122.90 | 86.51 | 158.56 | 92.79 |

$T_c$/° C. = Crystallisation temperature
$\Delta H_c$/J $g^{-1}$ = Enthalpy of crystallisation
$T_m$/° C. = Melting point
$\Delta H_m$/J $g^{-1}$ = Enthalpy of melting.

b) Effect of Intercalated Anions on PP/LDH Nanocomposites.

Figure 13:
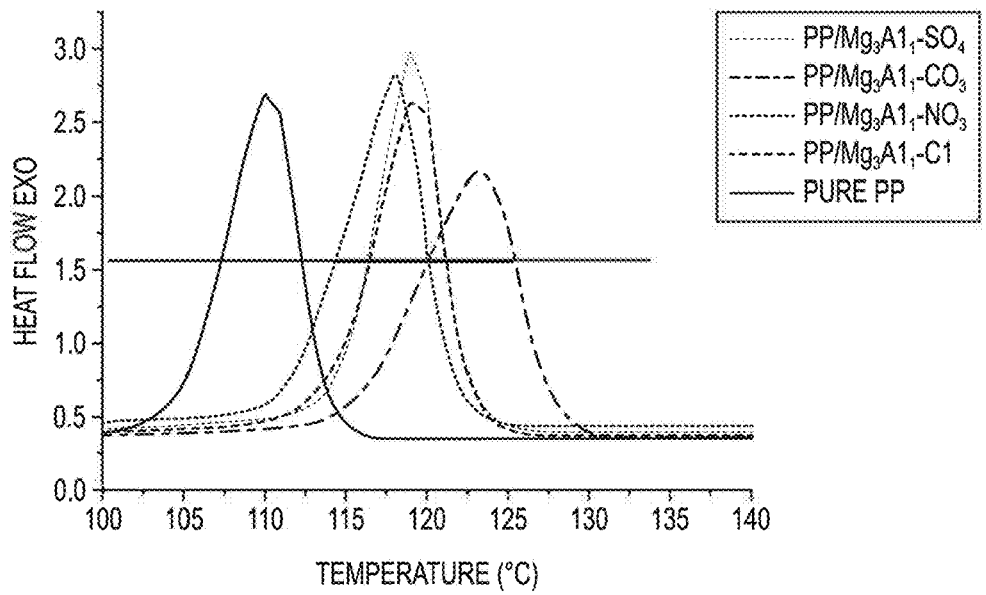
FIG. 13 shows the effect of the interlayer anions on the crystallisation temperature of PP/LDH nanocomposites.

The influence of the interlayer anions on the melting and crystallization temperatures of PP/$Mg_3Al_1$—X (X=$SO_4^{2-}$, $CO_3^{2-}$, $NO_3^-$, and $Cl^-$) was investigated, see Table 2 and FIG. 13. All the LDHs studied increase the melting and crystallization temperatures of the nanocomposite, the promoting effect varies with different anions. The highest $T_c$ was observed with $Mg_3Al_1$—$CO_3$ LDH as the additive.

TABLE 2

DSC results of PP/$Mg_3Al_1$—$CO_3$ with different interlayer anions at 9 wt % loading.

| Nanocomposites | $T_c$/° C. | $\Delta H_c$/J $g^{-1}$ | $T_m$/° C. | $\Delta H_m$/J $g^{-1}$ |
| --- | --- | --- | --- | --- |
| Pure PP | 108.31 | 85.61 | 153.65 | 85.70 |
| PP-$Mg_3Al_1$—$SO_4$, | 119.43 | 81.38 | 158.33 | 85.54 |
| PP-$Mg_3Al_1$—$CO_3$, | 121.27 | 87.94 | 157.98 | 89.37 |
| PP-$Mg_3Al_1$—$NO_3$, | 118.17 | 89.09 | 156.56 | 93.74 |
| PP-$Mg_3Al_1$—Cl, | 119.22 | 89.89 | 156.66 | 87.09 |

Figure 14:
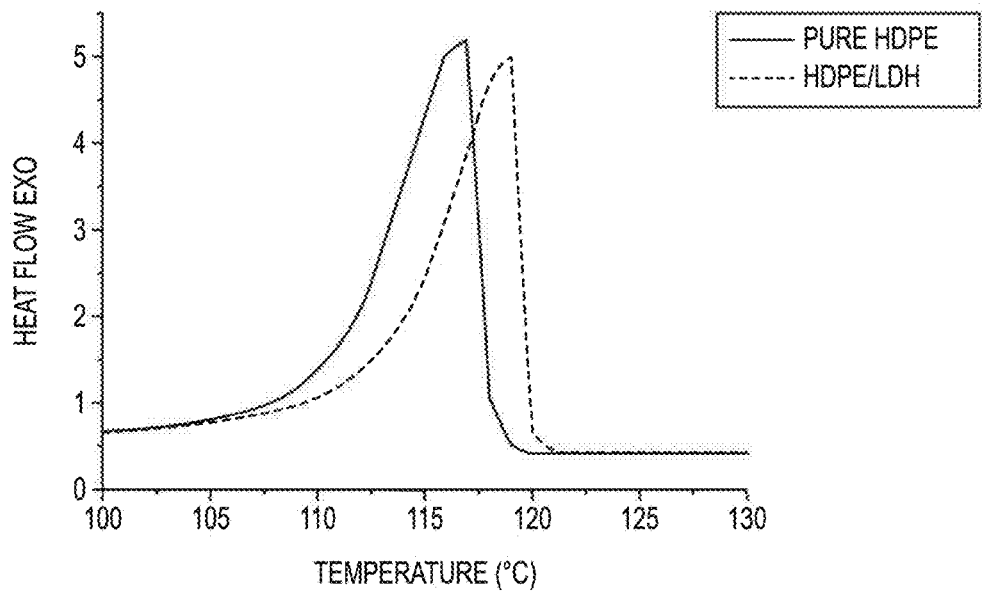
FIG. 14 shows the effect of the LDH loadings on the crystallisation temperature of HDPE/LDH nanocomposites.

We also studied the effect of adding $Mg_3Al_1$—$CO_3$ LDH on the melting and crystallization temperature of High Density Polyethylene (HDPE). After adding 9 wt % of LDH, $T_m$ kept unchanged and $T_c$ was slightly increased by 2° C., see Table 3 and FIG. 14.

TABLE 3

DSC results of HDPE and HDPE/Mg$_3$Al$_1$—CO$_3$ (at 9 wt % loading).

| Nanocomposites | $T_c$/° C. | $\Delta H_c$ /J g$^{-1}$ | $T_m$/° C. | $\Delta H_m$ /J g$^{-1}$ |
|---|---|---|---|---|
| Pure HDPE | 116.73 | 178.2 | 129.19 | 172.3 |
| HDPE-Mg$_3$Al$_1$—CO$_3$ | 118.82 | 166.9 | 129.09 | 161.0 |

Solvents for Washing the LDHs

The following organic solvents have been studied, have good miscibility with water and can be used to wash the LDHs paste.

TABLE 4

| Solvents | Boiling point (° C.) | Viscosity (cPoise) | P' | Solubility in water (% w/w) |
|---|---|---|---|---|
| Acetone | 56 | 0.32 | 5.1 | 100 |
| Acetonitrile | 82 | 0.37 | 5.8 | 100 |
| Dimethylformamide | 155 | 0.92 | 6.4 | 100 |
| Dimethyl Sulfoxide | 189 | 2 | 7.2 | 100 |
| Dioxane | 101 | 1.54 | 4.8 | 100 |
| Ethanol | 78 | 1.2 | 4.3 | 100 |
| Methanol | 65 | 0.6 | 5.1 | 100 |
| n-propanol | 97 | 2.27 | 4.0 | 100 |
| Iso-propanol (2-propanol) | 82 | 2.3 | 3.9 | 100 |
| Tetrahydrofuran | 65 | 0.55 | 4.0 | 100 |

Solvents for Dispersing LDHs

Many different solvents were tested as dispersing solvents, and it seems aromatic solvents give good dispersion. "Good" dispersion means that an optically clear, transparent stable dispersion was formed. "Not good" means the dispersion was not complete and some precipitate was apparent.

(1) Alkanes

| Solvents | Formula | Boiling point (° C.) | P' | Dispersion |
|---|---|---|---|---|
| Hexane | C$_6$H$_{14}$ | 69 | 0.1 | Not good |
| trimethylpentane | C$_8$H$_{18}$ | 99.3 | 0.1 | Not good |
| Decane | C$_{10}$H$_{22}$ | 174 | 0.3 | Not good |
| Dodecane | C$_{12}$H$_{26}$ | 216 | | Not good |

(2) Alcohols

| Solvents | Formula | P' | Dispersion |
|---|---|---|---|
| Methanol | CH$_3$OH | 5.1 | Not good |
| Ethanol | C$_2$H$_5$OH | 4.3 | Not good |
| 1-Butanol | C$_4$H$_9$OH | 3.9 | Not good |

(3) Ethers

| Solvents | Formula | Structure | P' | Dispersion |
|---|---|---|---|---|
| Dioxane | C$_4$H$_8$O$_2$ | 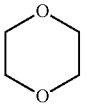 | 4.8 | Not good |
| Tetrahydrofuran (THF) | C$_4$H$_8$O |  | 4.0 | Not good |
| Diethyl ether | C$_4$H$_{10}$O | 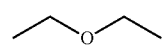 | 2.8 | Not good |

(4) Ketone

| Solvents | Formula | Structure | P' | Dispersion |
|---|---|---|---|---|
| Acetone | C$_3$H$_6$O |  | 5.1 | Not good |

(5) Aromatic Solvents

| Solvents | Formula | Structure | P' | dispersion |
|---|---|---|---|---|
| benzene | C$_6$H$_6$ |  | 2.7 | good |
| toluene | C$_6$H$_5$—CH$_3$ | 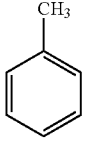 | 2.4 | good |
| xylene | C$_6$H$_4$(CH$_3$)$_2$ | 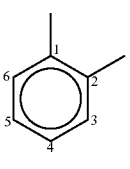 | 2.5 | good |

-continued

| Solvents | Formula | Structure | P' | dispersion |
|---|---|---|---|---|
| mesitylene | $C_6H_3(CH_3)_3$ | | | good |
| benzyl alcohol | $C_6H_5CH_2OH$ | | | good |
| Chlorobenzene | $C_6H_5Cl$ | | 2.7 | good |
| o-Dichlorobenzene | $C_6H_4Cl_2$ | | 2.7 | good |
| Trichlorobenzene | $C_6H_3Cl_3$ | | | good |
| Benzenesulfonyl chloride | $C_6H_5SO_2Cl$ | | | Not good |
| Benzoyl chloride | $C_6H_5COCl$ | | | Not good |
| Benzaldehyde | $C_6H_5CHO$ | | | Not good |

Polarity (P') as defined in Snyder and Kirkland (Snyder, L. R.; Kirkland, J. J. In Introduction to modern liquid chromatography, 2nd ed.; John Wiley and Sons: New York, 1979; pp 248-250)

Figure 9:
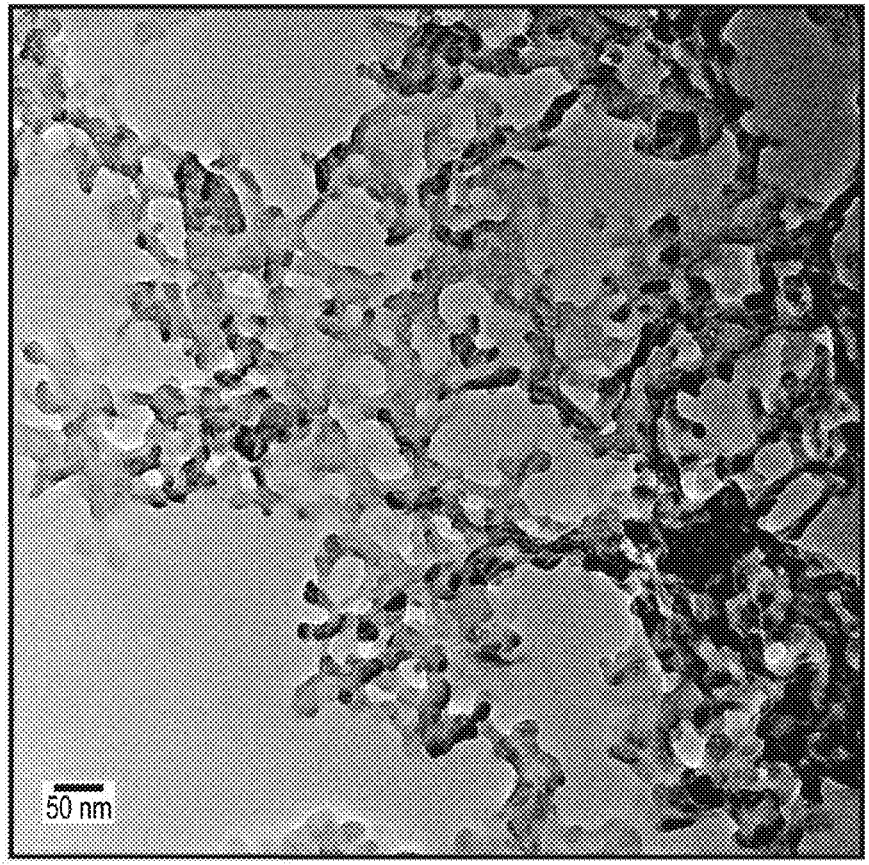
FIG. 9 shows a transmission electron micrograph (TEM) images of $Mg_3Al_1$—$CO_3$ LDH dispersed in $H_2O$.
Figure 10:
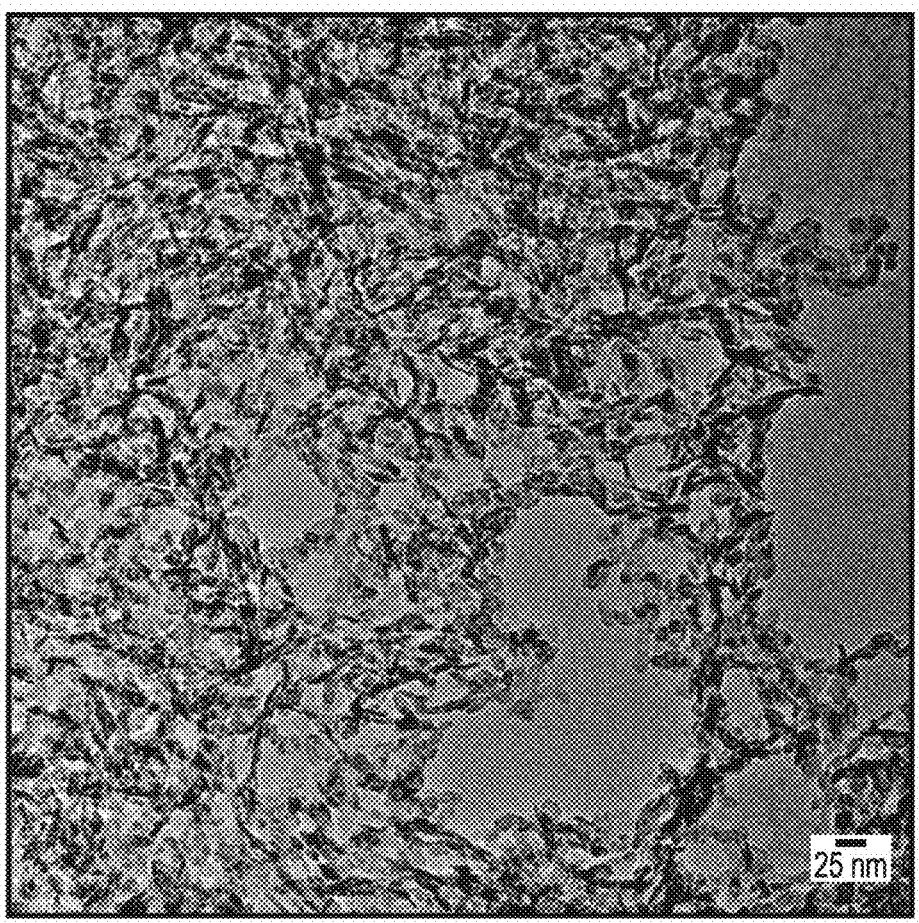
FIG. 10 shows TEM image of $Mg_3Al_1$—$CO_3$ LDH dispersed in xylene.

FIGS. 9 and 10 show TEM images of one example of $Mg_3$—Al—$CO_3$ LDH dispersed in $H_2O$ and xylene. From these two images it is apparent that after washing with acetone, and re-dispersing into xylene, the particle size and shape remain generally unchanged.

UV-Visible Spectrometry Data

Figure 16:
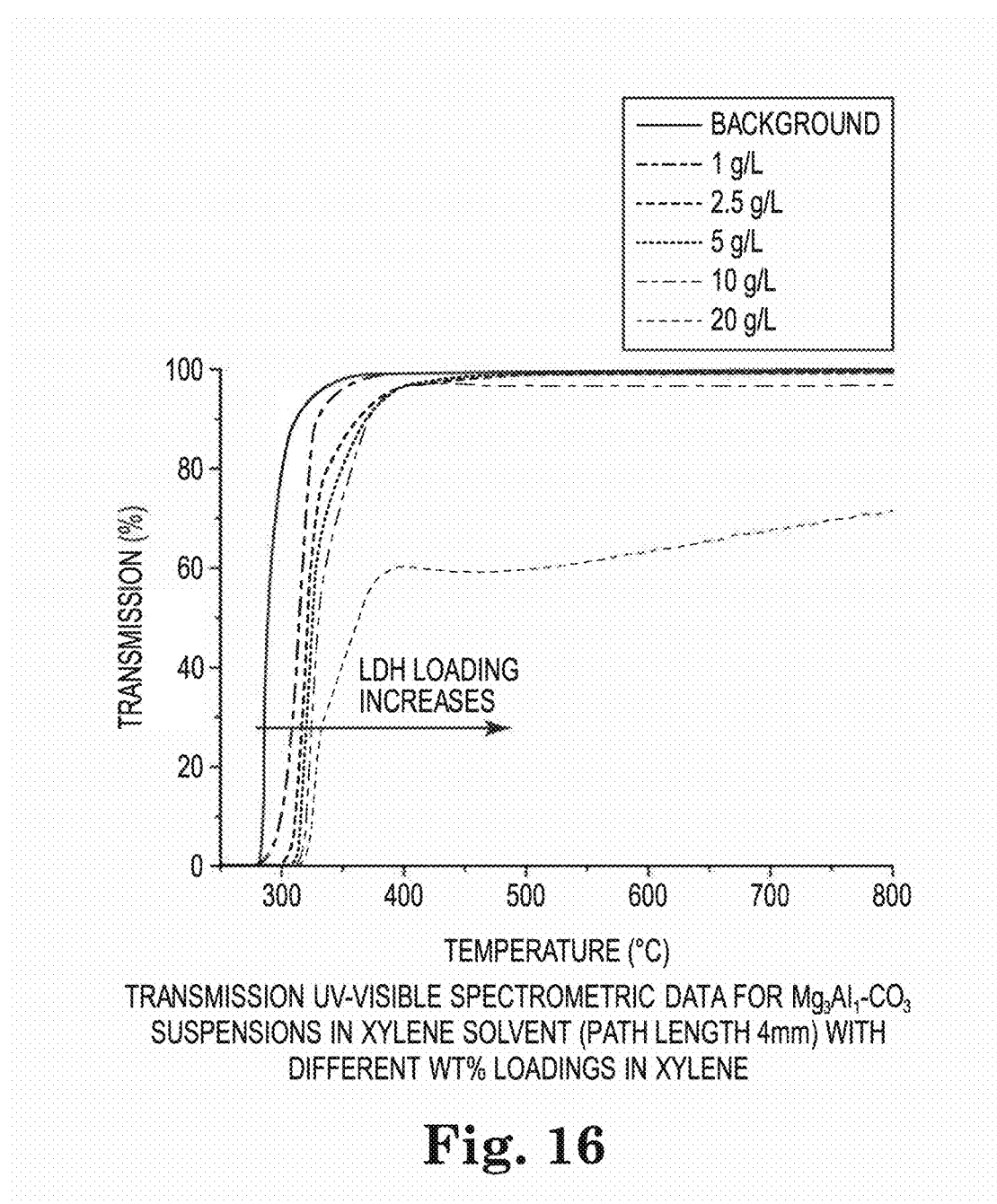
FIG. 16 shows transmission UV-Visible spectrometric data for $Mg_3Al_1$—$CO_3$ suspensions in xylene solvent (path length 4 mm) with different w % loadings in xylene.

Evidence of the clarity, transparency and stability of the LDH suspensions in xylene was demonstrated by transmission UV-Visible spectrometry. The results are shown in FIG. 16.

The example is an $Mg_3Al_1$—$CO_3$ suspension in xylene, the $Mg_3Al_1$—$CO_3$ particles are well dispersed and negligible light scattering is observed even with a loading as high as 10 g/L. A transmission factor of 99.8% and 96.8% was achieved with 5 g/L and 10 g/L suspension, respectively at 500 nm. When the LDH loading was increased to 20 g/L, the transmission decreased to ca. 60% at 500 nm.

No change in the UV/Vis spectra are observed after 24 hours standing

This result indicates that the LDH suspension in xylene is optically transparent and stable.

Colored Polymer and UV Absorption

Tartrazine is a good organic UV absorber, therefore, the UV absorbance of PP/$Mg_3$Al-tartrazine nanocomposites was evaluated (see FIG. 19). Even with 1 wt % of Mg₃Al-tartrazine LDH, 82% of UV absorbance was achieved at 350 nm. This result suggests that adding Mg₃Al-tartrazine LDH can significantly increase the thermal stability and the UV absorption. In the meantime, colored polymers can be obtained.

The features disclosed in the foregoing description, in the claims and/or in the accompanying drawings may, both separately and in any combination thereof be material for realizing the invention in diverse forms thereof.

What is claimed is:

1. A modified layered double hydroxide obtained by washing a particulate comprising a layered double hydroxide at least once with a first solvent to obtain a modified layered double hydroxide, wherein the layered double hydroxide has the formula $$[M^{z+}_{1-x}M'^{y+}_{x}(OH)_2]^{q+}(X^{n-})_{q/n} \cdot bH_2O$$

wherein M and M' are metal cations, z is 1 or 2, x is 0.1 to 1, b is 0 to 5, y is 3 or 4, X is an anion, n is 1 to 3 and q is determined by x, y and z; and wherein the first solvent is a water miscible solvent having a solvent polarity P' in the range of 3.8 to 9,
wherein the modified layered double hydroxide is dispersible in a hydrocarbon solvent.

2. The modified layered double hydroxide of claim 1 wherein X is selected from halide, inorganic oxyanion, anionic surfactants, anionic chromophores, anionic UV absorbers, or mixtures thereof.

3. The modified layered double hydroxide of claim 1 wherein the particle size of the layered double hydroxide particulate is in the range of 1 nm to 50 microns.

4. The modified layered double hydroxide of claim 1 wherein z is 2 and M is Ca, Mg, Zn, Fe, or a mixture thereof.

5. The modified layered double hydroxide of claim 1 wherein M' is Al.

6. A hydrocarbon-dispersed layered double hydroxide dispersion formed by adding a hydrocarbon solvent to the modified layered double hydroxide of claim 1.

7. The hydrocarbon-dispersed layered double hydroxide of claim 6 wherein the hydrocarbon solvent comprises an aromatic compound.

8. The hydrocarbon-dispersed layered double hydroxide of claim 7 wherein the aromatic compound is selected from benzene, toluene, xylene, mesitylene, benzyl alcohol, chlorobenzene, o-dichlorobenzene, trichlorobenzene, or a mixture of two or more thereof.

9. A polymer loaded hydrocarbon dispersion formed by dissolving a polymer in the hydrocarbon-dispersed layered double hydroxide of claim 6.

10. The polymer loaded hydrocarbon dispersion of claim 9 wherein the polymer is selected from polyolefins, vinyl polymers, saturated polyesters, or mixtures thereof.

11. The polymer loaded hydrocarbon dispersion of claim 9 wherein the polymer is polyethylene, polypropylene, or a mixture thereof.

12. A composite composition obtained by precipitating the polymer loaded hydrocarbon dispersion of claim 9.

13. The composite composition of claim 12 wherein the layered double hydroxide is present in the composition at 0.01 wt % to 85 wt % based on the weight of the polymer.

14. A method for forming a modified layered double hydroxide, the method comprising washing a particulate comprising a layered double hydroxide at least once with a first solvent to obtain a modified layered double hydroxide, wherein the layered double hydroxide has the formula $$[M^{z+}_{1-x}M'^{y+}_{x}(OH)_2]^{q+}(X^{n-})_{q/n} \cdot bH_2O$$

wherein M and M' are metal cations, z is 1 or 2, x is 0.1 to 1, b is 0 to 5, y is 3 or 4, X is an anion, n is 1 to 3 and q is determined by x, y and z; and wherein the first solvent is a water miscible solvent having a solvent polarity P' in the range of 3.8 to 9,
wherein the modified layered double hydroxide is dispersible in a hydrocarbon solvent.

15. The method of claim 14 further comprising washing the layered double hydroxide with a mixture of water and a water miscible solvent prior to the washing with the first solvent.

16. The method of claim 15 wherein the water miscible solvent mixed with water is a $C_1$ to $C_3$ alcohol.

17. The method of claim 14 wherein the first solvent is selected from acetone, acetonitrile, dimethylformamide, dimethyl sulfoxide, dioxane, ethanol, methanol, n-propanol, 2-propanol, tetrahydrofuran, or a mixture of two or more thereof.

18. The method of claim 14 further comprising dispersing the modified layered double hydroxide in a hydrocarbon solvent to form a hydrocarbon-dispersed layered double hydroxide.

19. The method of claim 18 wherein the hydrocarbon solvent comprises an aromatic compound.

20. The method of claim 19 wherein the hydrocarbon solvent is selected from benzene, toluene, xylene, mesitylene, benzyl alcohol, chlorobenzene, o-dichlorobenzene, trichlorobenzene, or a mixture of two or more thereof.

* * * * *